United States Patent
Lee

[11] Patent Number: 5,920,339
[45] Date of Patent: Jul. 6, 1999

[54] SPOT KILLER CIRCUIT FOR A CATHODE RAY TUBE

[75] Inventor: Kab-keun Lee, Suwon, Rep. of Korea

[73] Assignee: Samsung Electronics Co., Ltd., Kyungki-do, Rep. of Korea

[21] Appl. No.: 08/668,823

[22] Filed: Jun. 24, 1996

[30] Foreign Application Priority Data

Jun. 24, 1995 [KR] Rep. of Korea ................ 95-17301

[51] Int. Cl.⁶ ................................................ H04N 3/20
[52] U.S. Cl. ........................ 348/173; 315/384; 315/386; 315/387
[58] Field of Search ................................ 348/173, 174, 348/380; 315/387, 384, 386

[56] References Cited

U.S. PATENT DOCUMENTS

| | | | |
|---|---|---|---|
| 4,056,758 | 11/1977 | Schaas | 315/381 |
| 4,390,817 | 6/1983 | Johnson | 348/173 |
| 4,488,181 | 12/1984 | Haferl | 315/381 |
| 5,089,754 | 2/1992 | George | 315/381 |

*Primary Examiner*—John K. Peng
*Assistant Examiner*—Paulos M. Natnael
*Attorney, Agent, or Firm*—Sughrue, Mion, Zinn, Macpeak & Seas, PLLC

[57] ABSTRACT

A spot killer circuit for a CRT is capable of thoroughly removing any spot persistence and prevents damage to the fluorescent body of the CRT due to inaccurate horizontal and vertical deflection. When the power cord is unplugged, or when the display device is turned off (for example, via remote control key input), the bias voltage of the first grid G1 and the electric potential of the cathode are controlled so as to completely suppress any residual beam current flowing in the CRT. In the case of an inaccuracy (such as total failure) in either the horizontal deflection or the vertical deflection signals, the bias voltage of the first grid and the electric potential of the cathode are controlled to suppress the CRT beam current just as in the case of power shut off. This prevents damage of the fluorescent body in the CRT due to the inaccurate deflection operation.

13 Claims, 3 Drawing Sheets

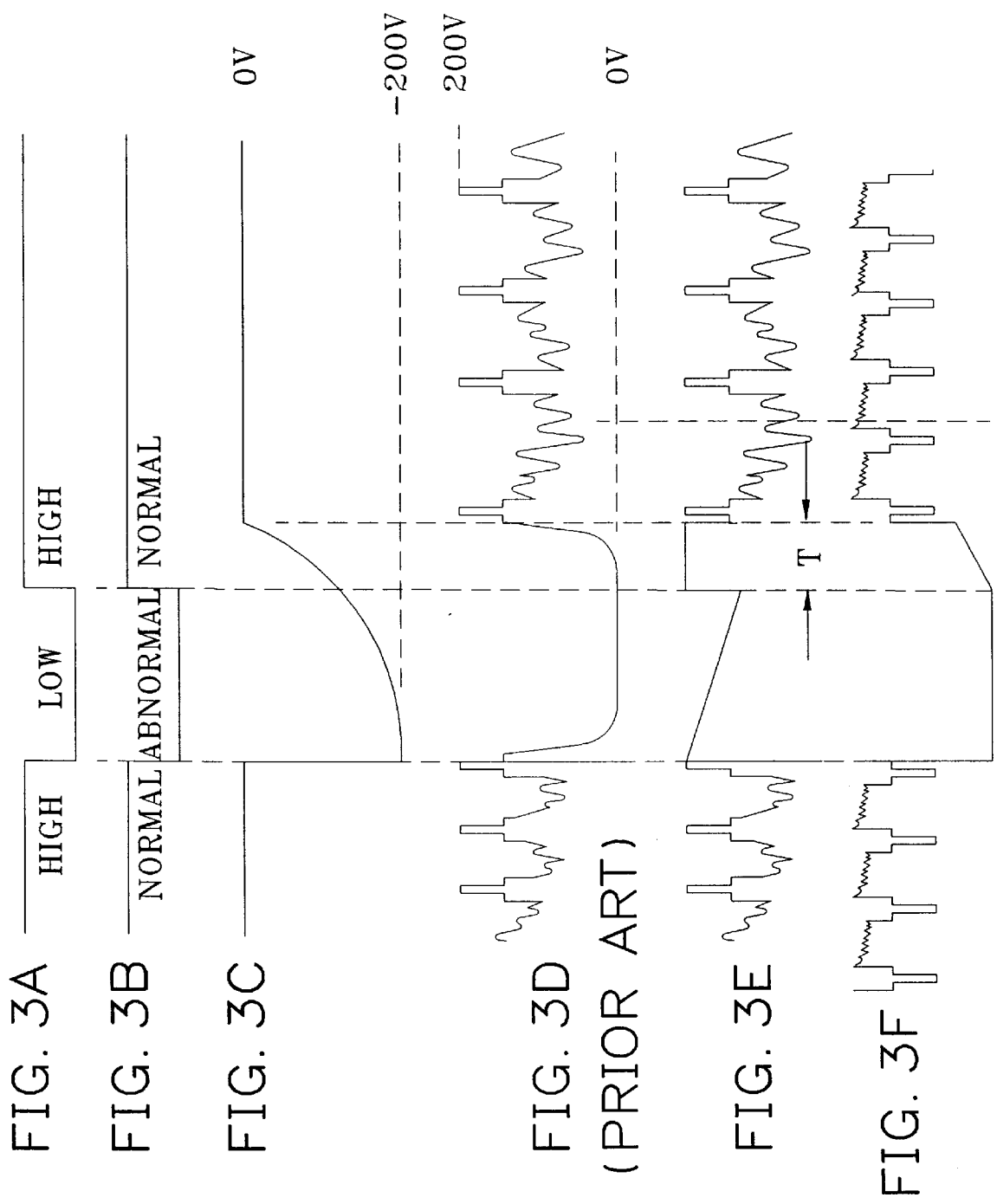

SPOT KILLER CIRCUIT FOR A CATHODE RAY TUBE

BACKGROUND OF THE INVENTION

The present invention relates to a spot killer circuit for a cathode ray tube (CRT) for removing persistence generated by a remaining beam current, and more particularly, to a spot killer circuit for a CRT which is capable of removing a persistence by controlling an electric potential between a first grid and a cathode in the CRT and preventing damage of the fluorescent body due to inaccurate horizontal and vertical deflection.

A CRT is generally used as a means for displaying a video signal. The CRT includes a first grid G1 for controlling a thermal electron beam, a second grid G2 for accelerating the thermal electron beam, and third and fourth grids G3 and G4 for collecting the accelerated thermal electron beam. The fourth grid G4 functions as an anode. A high voltage of 25 kV to 32 kV applied to the anode is conducted through an internal conductive film of the CRT. Under this configuration, when a beam current which flows from the anode to a cathode remains behind, a phenomenon of leaving a spot on a screen occurs.

That is, when a power shut-off operation is performed frequently in a video apparatus such as a television set, a spot (or "afterimage") is generated on the screen due to a remaining beam current. To solve this problem, a conventional spot killer circuit for a CRT, as shown in FIG. 1, is connected to a first grid G1. By using such a circuit, the spot could be removed to some degree.

FIG. 1 is a circuit diagram showing a conventional spot killer circuit. As shown in FIG. 1, the conventional spot killer circuit is composed of a first power controller 1 for supplying or cutting off a standby voltage under control of a microcomputer, and a second power controller 2 for supplying or cutting off the standby voltage according to whether a power cord is plugged in or not.

The second power controller 2 includes a bias resistor R3 whose one end is connected to the standby voltage, a bias resistor R4 whose one end is grounded, and a transistor Q2 having a base which receives the standby voltage divided by the series bias resistors R3 and R4. The collector of Q2 receives the standby voltage via a resistor R5 and an emitter which is grounded. In the second power controller 2, the collector of the transistor Q2 becomes low when a power cord is plugged in so as to provide the CRT with the standby voltage. Accordingly, the magnitude of second current $I_2$ flowing through diode D2 is zero. Meanwhile, if the power cord is unplugged, the standby voltage is not provided to the transistor Q2. As a consequence, the electric potential applied to the base of the transistor Q2 becomes gradually lowered. Then, when the electric potential of the base of the transistor Q2 falls below approximate 0.7 V, the operating region of the transistor Q2 is changed into the cutoff region. As a result, the second current $I_2$ flowing through the resistor R5 charges a capacitor C1 via a diode D2. The voltage of capacitor C1 is applied to the base of a transistor Q3 via a resistor R6. The collector of the transistor Q3 receives a driving voltage via a resistor R7. The collector of the transistor Q3 is connected to a resistor R8 connected in parallel with a capacitor C2. A first grid G1 is connected to the output of the transistor Q3 via the resistor R8. Thus, when the transistor Q3 is in the cutoff region, a third current $I_3$ charges the capacitor C2.

However, if the second current $I_2$ flows to charge capacitor C1, the potential of the base of the transistor Q3 raises to switch the operating region of the transistor Q3 into the saturation region, and the third current $I_3$ is not supplied to the capacitor C2. The electric potential of the collector of the transistor Q3, which receives the driving voltage of about 200 V via the resistor R7, drops to about 0 V immediately after the operating region is switched into the saturation region. Here, the driving voltage is for driving the CRT. Accordingly, the charging potential of the capacitor C2 whose one end is connected to the collector of the transistor Q3 becomes changed. That is, if the capacitor C2 maintains a charged potential of 200 V between its two ends (charge-up occurs when Q3 is in a cut-off state) and then the transistor Q3 switches to the saturation state, the positive end of the capacitor C2 (connected to the collector of Q3) drops down to 0 V and the negative end thereof drops down to −200 V. Accordingly, the bias voltage applied to the first grid G1 which is connected with the capacitor C2 falls down to −200 V. As a result, the operating region of the first grid G1 is switched into the cutoff region to cut off the beam current to thereby remove any spot.

When a user turns on or off a video apparatus using a key input unit (not shown), the first power controller 1 operates to remove the afterimage spot. This will be described below. As an example, if the video apparatus is turned off by means of the key input unit, the microcomputer (not shown) outputs a control signal of a low state. The transistor Q1 which receives the control signal via the resistor R1 is switched into the cut-off region. At this time, the collector of the transistor Q1 becomes high and thus the first current $I_1$ flows through the diode D1 to charge up the capacitor C1 and provide a bias voltage for Q3 via the resistor R6. Thus, the transistor Q3 is switched into the saturation region. Thereafter, since the bias voltage applied to the first grid G1 falls down to −200 V, the operating region of the first grid G1 is switched into the cutoff region. Thus, the spot is removed by cutting off the beam current as described above.

In other words, the conventional afterimage removal circuit for the CRT lowers the bias voltage applied to the first grid G1 down to −200 V under control of the microcomputer when the video apparatus is turned off, or when the power cord is unplugged, to thereby suppressing generation of the beam current to kill the afterimage spot.

However, although the electric potential of the first grid G1 is lowered down to −200 V, the electric potential of the cathode maintains about 0 V. As a result, a spot phenomenon displayed brightly on a part of the screen can still occur. That is, if the beam current is not completely cut off, the spot is left on the screen.

Further, when the operation of deflecting the thermal electron beam horizontally or vertically is inaccurate, the fluorescent body of the CRT may be damaged.

SUMMARY OF THE INVENTION

To solve the above problems, it is an object of the present invention to provide a spot killer circuit for completely removing beam currents which cause a spot phenomenon by applying an appropriate bias voltage to a first grid and a cathode.

Another object of the present invention can be accomplished by providing a spot killer circuit for preventing a damage of a fluorescent body due to inaccurate vertical and horizontal deflection caused from a manufacturing error or the improper operation of the deflection coils by controlling the electric potential of a first grid and a cathode based upon horizontal and vertical flyback pulse signals.

To accomplish the above object of the present invention, there is provided a spot killer circuit for a cathode ray tube for removing a spot by controlling a bias voltage of a first grid G1. The spot killer circuit includes:

a transistor which receives a standby voltage;

a transistor bias circuit, which receives a horizontal flyback pulse signal and a vertical flyback pulse signal, for biasing said transistor to supply or cut off a predetermined control current;

a first grid controller which selectively supplies a predetermined bias voltage to the first grid of the cathode ray tube by supplying or cutting off a driving voltage according to the control current supplied from said transistor; and a cathode controller which selectively supplies or cuts off the color signal to the cathode according to the control current supplied from said transistor.

BRIEF DESCRIPTION OF THE DRAWINGS

The preferred embodiments are described with reference to the drawings wherein:

FIGS. 3A through 3C, 3E, and 3F are waveform diagrams illustrating operation of portions of the circuit of FIG. 2.

FIG. 3D is a waveform diagram illustrating operation of a conventional spot killer circuit.

DETAILED DESCRIPTION OF THE PREFERRED EMBODIMENT

A preferred embodiment of the present invention will be described below in more detail with reference to FIGS. 2 and 3A through 3F.

Figure 1:
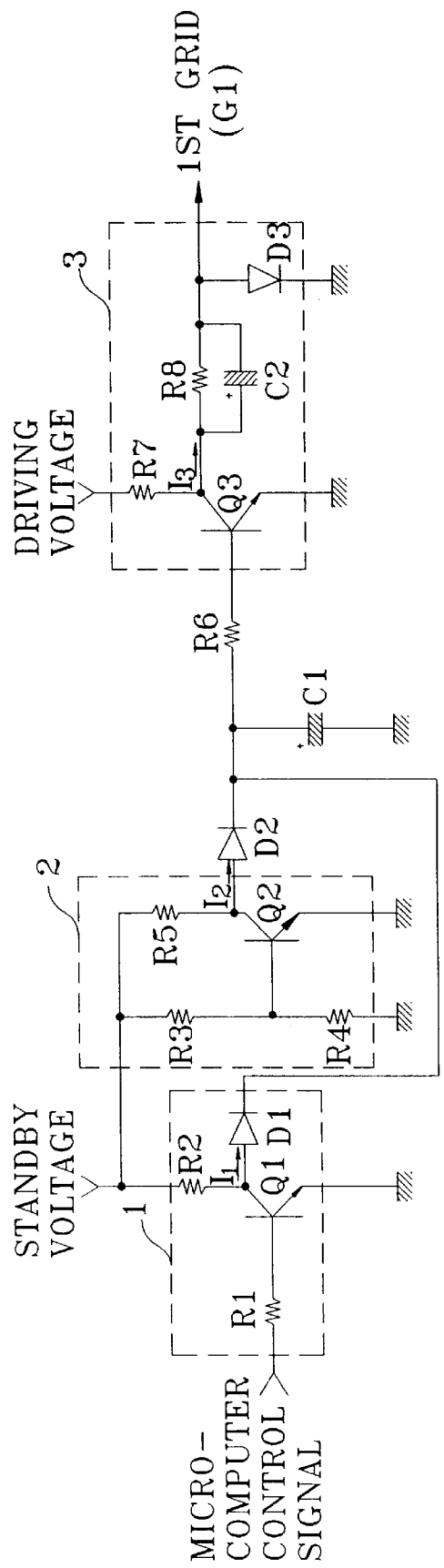
FIG. 1 is a circuit diagram of a conventional spot killer circuit for a CRT.
Figure 2:
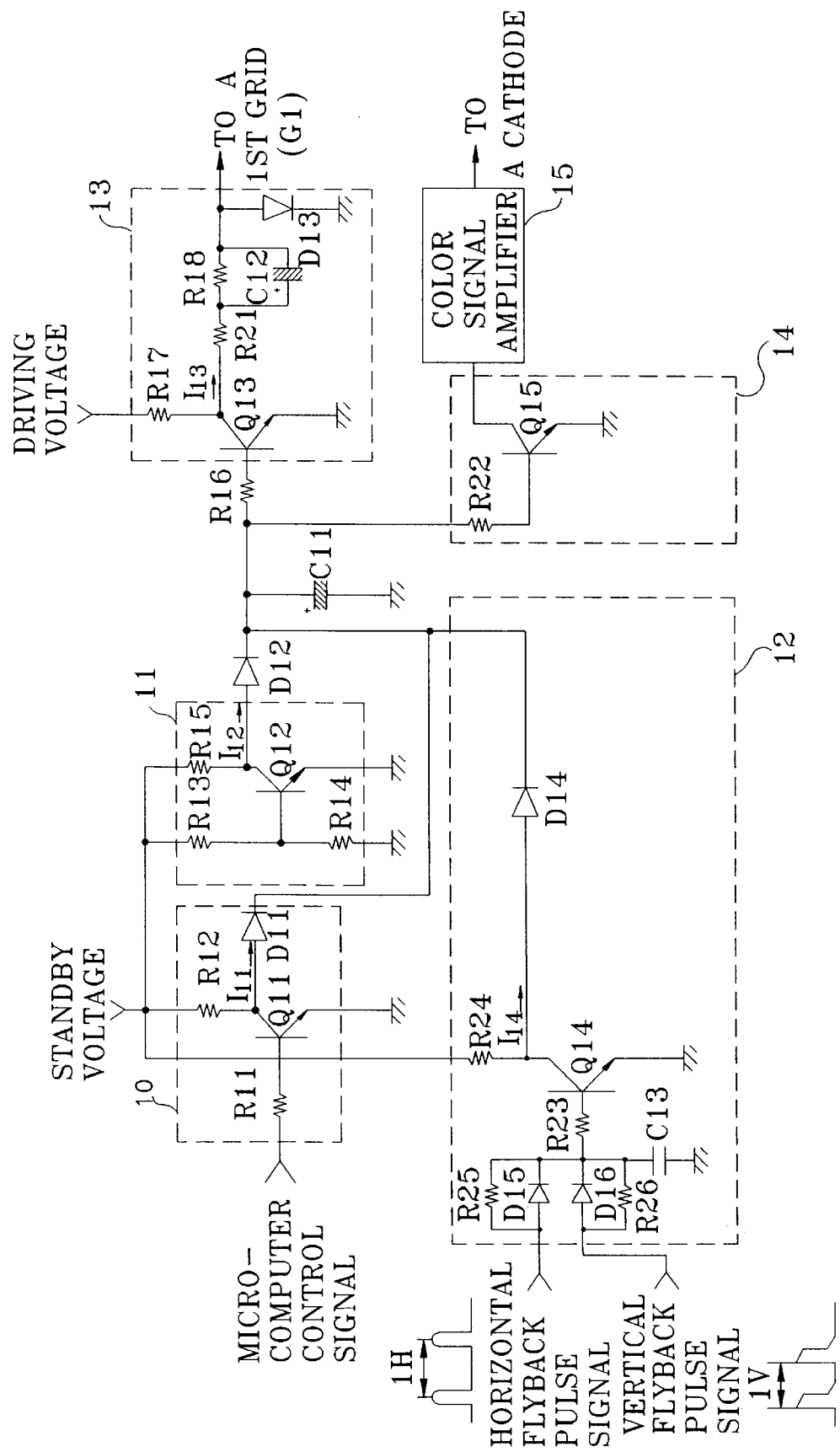
FIG. 2 is a circuit diagram of a spot killer circuit for a CRT according to the present invention.

As shown in FIG. 2, the spot killer circuit for a CRT includes a third power controller 12 and a cathode controller 14, for controlling electric potentials applied to a first grid G1 and a cathode when beams of thermal electrons are inaccurately deflected horizontally or vertically due to improper operation of a deflection yoke (not shown) for deflecting the beams of the thermal electrons emitted from the cathode.

A first power controller 10 and a second power controller 11 are described only briefly as they perform the same functions as those of the above-described conventional spot killer circuit. The operations of the third power controller 12 and the cathode controller 14 will be described below in detail.

In FIG. 2, the second power controller 11 controls a second current $I_{12}$ according to the operation of the transistor Q12 which corresponds to whether a power cord is plugged in or not; that is, a standby voltage is supplied or cut off. Also, the first power controller 10 controls a first current $I_{11}$ according to the operation of the transistor Q11. A microcomputer controller recognizes that the apparatus via a key input unit such as a remote controller and outputs a control signal of a low or high state. When the apparatus is turned off, the microcomputer outputs a control signal of a low state as shown in FIG. 3A. The first current $I_{11}$ or the second current $I_{12}$ charge capacitor C11 via diodes D11 and D12, respectively, and thereby supply bias voltage to the first grid controller 13. When the first or second current, $I_{11}$ or $I_{12}$, respectively, is supplied to the first grid controller 13, the bias voltage of the first grid G1 is lowered down to $-200$ V as shown in FIG. 3C, of which the operation is nearly same as the conventional circuit 3 described above, thus the detailed description thereof will be omitted.

The function of the cathode controller 14 when first or second current $I_{11}$ or $I_{12}$ is supplied thereto will be described below. As an example, if the first current $I_{11}$ or the second current $I_{12}$ is applied to the base of a transistor Q15 via a resistor R22, the operating region of the transistor Q15 is switched into a saturation region and R, G and B chrominance signals are not output from a color signal amplifier 15. Accordingly, a color signal is not supplied to the cathode. Here, the waveform output from the color signal amplifier 15 is shown in FIG. 3F, which represents that the color signal is not output from the color signal amplifier 15 to the cathode. When the cathode is of a negative type, the electric potential of the cathode is nearly the same as that of the driving voltage. Accordingly, as in the output waveform of the cathode shown in FIG. 3E, the electric potential of the cathode gradually decreases and then increases to the electric potential of the driving voltage of about 200 V, when the power cord is plugged in or out, or the operation of the apparatus stops under control of the microcomputer. In other words, compared with the case that the electric potential of the cathode is lowered to 0 V as shown in FIG. 3D which shows the cathode voltage in the case of the conventional spot killer art, the electric potential of the cathode in the present invention is forced to be the electric potential of the driving voltage at an early time by an interval T, to thereby thoroughly remove any spot. The reason for doing this is that since the cathode is a negative type, the lower electric potential the cathode has, the brighter the screen becomes.

Also, when a key input unit is manipulated to activate (i.e., turn on) the apparatus, the microcomputer outputs a control signal of a high state. Thus, the first current $I_{11}$ is not applied to the cathode controller 14. As a result, the cathode receives the non-preheated standby voltage, which causes a bright spot to appear on the screen. To prevent such a phenomenon, the operating region of the transistor Q15 in the cathode controller 14 is switched into the saturation region (due to residual charge in capacitor C11), which causes the chrominance signals not to be applied to the cathode to remove the spot.

Meanwhile, a third power controller 12 controls a third current $I_{14}$ according to the operation of the transistor Q14 due to the presence of a horizontal flyback pulse signal and a vertical flyback pulse signal which are applied via two input ends, respectively. In more detail, if a deflection operation for deflecting the thermal electron beam emitted from the cathode is normal, a horizontal flyback pulse signal is generated each one horizontal blanking interval, and a vertical flyback pulse signal is generated each one vertical blanking interval. The horizontal flyback pulse signal is applied to the base of the transistor Q14 via a diode D15 and a resistor R23, to charge up capacitor C13. The vertical flyback pulse signal is applied to the base of the transistor Q14 via a diode D16 and a resistor R23, to charge up capacitor C13. As such, when the combined horizontal/vertical flyback pulse signal is applied to the base of the transistor Q14, the collector of the transistor Q14 becomes low because it is biased to operate in its saturation region. Accordingly, the fourth current $I_{14}$ is not supplied to the diode D14. So long as the horizontal and vertical flyback pulse signals remain normal, the pulse pattern applied to the base of the transistor Q14 maintains a sufficiently high potential to maintain Q14 conducting.

On the other hand, if the deflection operation is not normal due to a manufacturing error or the improper operation of the deflection coils, the horizontal flyback pulse signal or the vertical flyback pulse signal is not fully generated. Accordingly, as shown in FIG. 3B, the pulse of the low state is applied to the base of the transistor Q14. In this case, the operating region of the transistor Q14 is switched into the cutoff region, which results in that the fourth current $I_{14}$ charges the capacitor C11 via the diode D14 and is supplied to the first grid controller 13 and the cathode controller 14, respectively.

If the fourth current $I_{14}$ is applied to the first grid controller 13, the bias voltage applied to the first grid G1 is lowered to −200 V. Thus, the beam current flowing between the anode and the cathode can be intercepted. That is, the operating region of the transistor Q13 is switched into the saturation region when the fourth current $I_{14}$ raises the potential of the base of Q13 by charging up capacitor C11 and presenting a bias potential via resistor R16. The positive end of the capacitor C12 then drops to 0 V and the negative end thereof drops to −200 V. Accordingly, the bias voltage applied to the first grid G1 is lowered.

At the same time, the fourth current $I_{14}$ charges the capacitor C11 and then is applied to the base of the transistor Q15 via the resistor R22. The collector of the transistor Q15 is connected to the color signal amplifier 15 which outputs the R, G and B chrominance signal to the cathode. Thus, if the fourth current $i_{14}$ flows via the base of the transistor Q15, the operating region of the transistor Q15 is switched into the saturation region, thereby preventing the color signal amplifier 15 from outputting the R, G and B chrominance signals. Thus, in case of the negative cathode, the electric potential of the cathode becomes nearly same as that of the driving voltage.

In FIG. 2, a resistor R21 is an overvoltage protection resistor which is connected to the collector of the transistor Q13, to prevent damage of the transistor Q13 due to internal discharging of the CRT.

As described above, the third power controller 12 outputs the fourth current $i_{14}$ in the present invention, thus causing the bias voltage of the first grid G1 to be lowered down to −200 V and the electric potential of the cathode to become close to the driving voltage, when the horizontal and vertical deflections are inaccurate. Accordingly, the present invention can prevent damage of the fluorescent body due to the inaccurate deflection operations.

When the power cord is unplugged, or the operation of the apparatus stops by use of the key input unit, the bias voltage applied to the first grid G1 is lowered to −200 V, and the electric potential of the cathode is raised up to 200 V. Accordingly, the beam current flowing between the anode in the CRT and the cathode is completely cut off, which thereby completely removes the spot generated by the beam current.

While only certain embodiments of the invention have been specifically described herein, it will be apparent that numerous modifications may be made thereto without departing from the spirit and scope of the invention.

What is claimed is:

1. A spot killer circuit for use with a cathode ray tube, to remove a spot by controlling bias voltage of a first grid of the cathode ray tube and by controlling a color signal supplied to a cathode of the cathode ray tube, the spot killer circuit comprising:

a transistor which receives a standby voltage;

a transistor bias circuit, which receives a horizontal flyback pulse signal and a vertical flyback pulse signal, for biasing said transistor to supply or cut off a predetermined control current;

a first grid controller which selectively supplies a predetermined bias voltage to the first grid of the cathode ray tube by supplying or cutting off a driving voltage according to the control current supplied from said transistor; and a cathode controller which selectively supplies or cuts off the color signal to the cathode according to the control current supplied from said transistor.

2. The spot killer circuit according to claim 1, further comprising:

a first controller, which receives the standby voltage, for supplying or cutting off a first bias current to said first grid controller and said cathode controller according to a control signal output from a microcomputer; and a second controller, which receives the standby voltage, for supplying or cutting off a second bias current to said first grid controller and said cathode controller according to whether a power cord for the cathode ray tube is unplugged or not.

3. The spot killer circuit according to claim 1, wherein said transistor supplies the control current to said first grid controller and said cathode controller when the horizontal flyback pulse signal or the vertical flyback pulse signal is not supplied due to inaccurate deflection of an electron beam emitted from the cathode.

4. The spot killer circuit according to claim 3, wherein said transistor switches into its saturation region when the horizontal flyback pulse signal and the vertical flyback pulse signal are applied to the base of the transistor.

5. The spot killer circuit according to claim 1, further comprising:

a capacitor having a first end and a second end, the first end being connected between said transistor and said cathode controller and the second end being grounded, said capacitor being charged by said control current.

6. The spot killer circuit according to claim 1, wherein said first grid controller comprises:

a grid transistor and a resistor for overvoltage protection to prevent the grid transistor from being damaged due to an overvoltage produced when the cathode ray tube is discharged.

7. A spot killer circuit for use with a cathode ray tube having a cathode, to remove a spot by controlling bias voltage of a first grid of the cathode ray tube, the spot killer circuit comprising:

a transistor which receives a standby voltage;

a transistor bias circuit, which receives a horizontal flyback pulse signal and a vertical flyback pulse signal, for biasing said transistor to supply or cut off a predetermined control current; and a first grid controller which selectively supplies a predetermined bias voltage to the first grid of the cathode ray tube by supplying or cutting off a driving voltage according to the control current supplied from said transistor.

8. The spot killer circuit according to claim 7, further comprising:

a first controller, which receives the standby voltage, for supplying or cutting off a first bias current to said first grid controller according to a control signal output from a microcomputer; and a second controller, which receives the standby voltage, for supplying or cutting off a second bias current to said first grid controller according to whether a power cord for the cathode ray tube is unplugged or not.

9. The spot killer circuit according to claim 7, wherein said transistor supplies the control current to said first grid controller when the horizontal flyback pulse signal or the vertical flyback pulse signal is not supplied due to inaccurate deflection of an electron beam emitted from the cathode.

10. The spot killer circuit according to claim 9, wherein said transistor switches into its saturation region when the horizontal flyback pulse signal and the vertical flyback pulse signal are accurately applied to the base of the transistor.

11. The spot killer circuit according to claim 7, further comprising:
  a capacitor having a first end and a second end, the first end being connected to said transistor and the second end being grounded, said capacitor being charged by said control current.

12. The spot killer circuit according to claim 7, wherein said first grid controller comprises:
  a grid transistor and
  a resistor for overvoltage protection to prevent the grid transistor from being damaged due to an overvoltage produced when the cathode ray tube is discharged.

13. A spot killer circuit for use with a cathode ray tube, to remove a spot by controlling bias voltage of a first grid of the cathode ray tube and by controlling a color signal supplied to a cathode of the cathode ray tube, the spot killer circuit comprising:

a first controller, which receives a standby voltage, for supplying or cutting off a first bias current according to a control signal output from a microcomputer; and a second controller, which receives the standby voltage, for supplying or cutting off a second bias current according to whether a power cord for the cathode ray tube is unplugged or not;

a first grid controller which selectively supplies a predetermined bias voltage to the first grid of the cathode ray tube by supplying or cutting off a driving voltage according to the first bias current supplied from said first controller and the second bias current supplied from said second controller; and a cathode controller which selectively supplies or cuts off the color signal to the cathode according to the first bias current supplied from said first controller and the second bias current supplied from said second controller.

* * * * *